Figure 1:
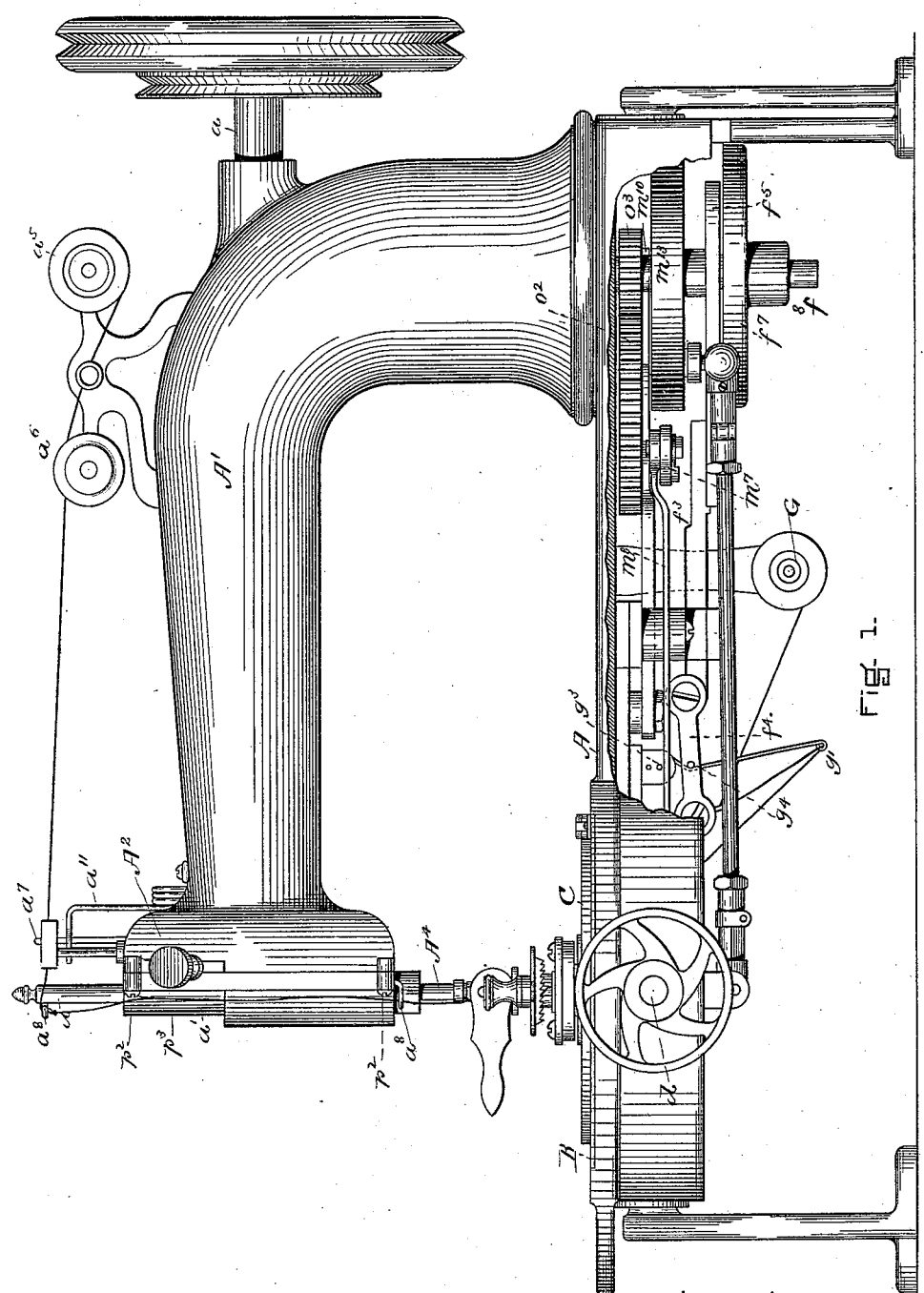

(No Model.) 7 Sheets—Sheet 1.

J. H. REED & F. W. BEALE.
BUTTON HOLE STITCHING AND BARRING MACHINE.

No. 355,028. Patented Dec. 28, 1886.

WITNESSES.
J. M. Dolan.
Fred. B. Dolan.

INVENTORS
James H. Reed
Forrest W. Beale
by their attys
Clarke & Raymond.

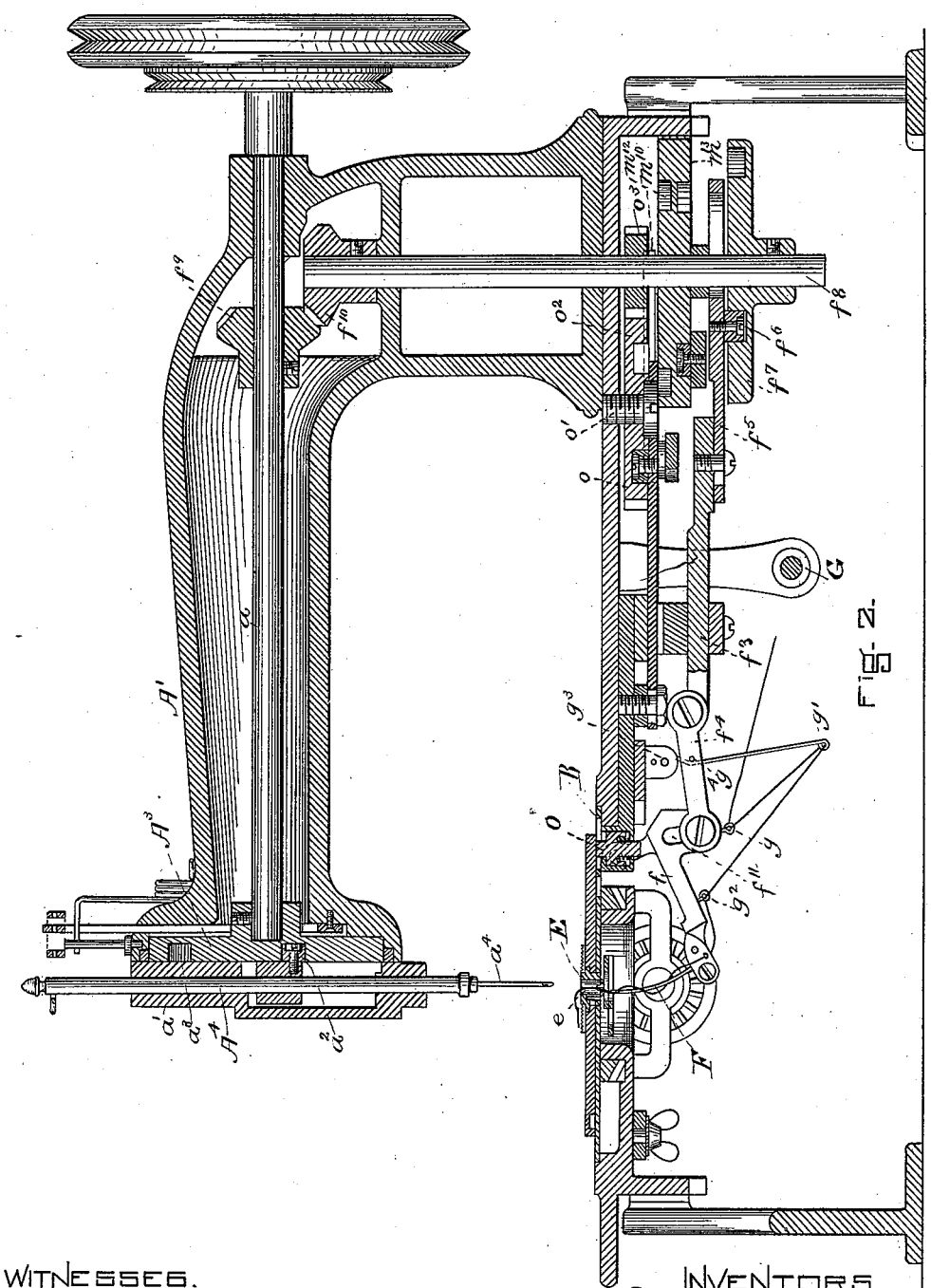

(No Model.) 7 Sheets—Sheet 3.
J. H. REED & F. W. BEALE.
BUTTON HOLE STITCHING AND BARRING MACHINE.
No. 355,028. Patented Dec. 28, 1886.
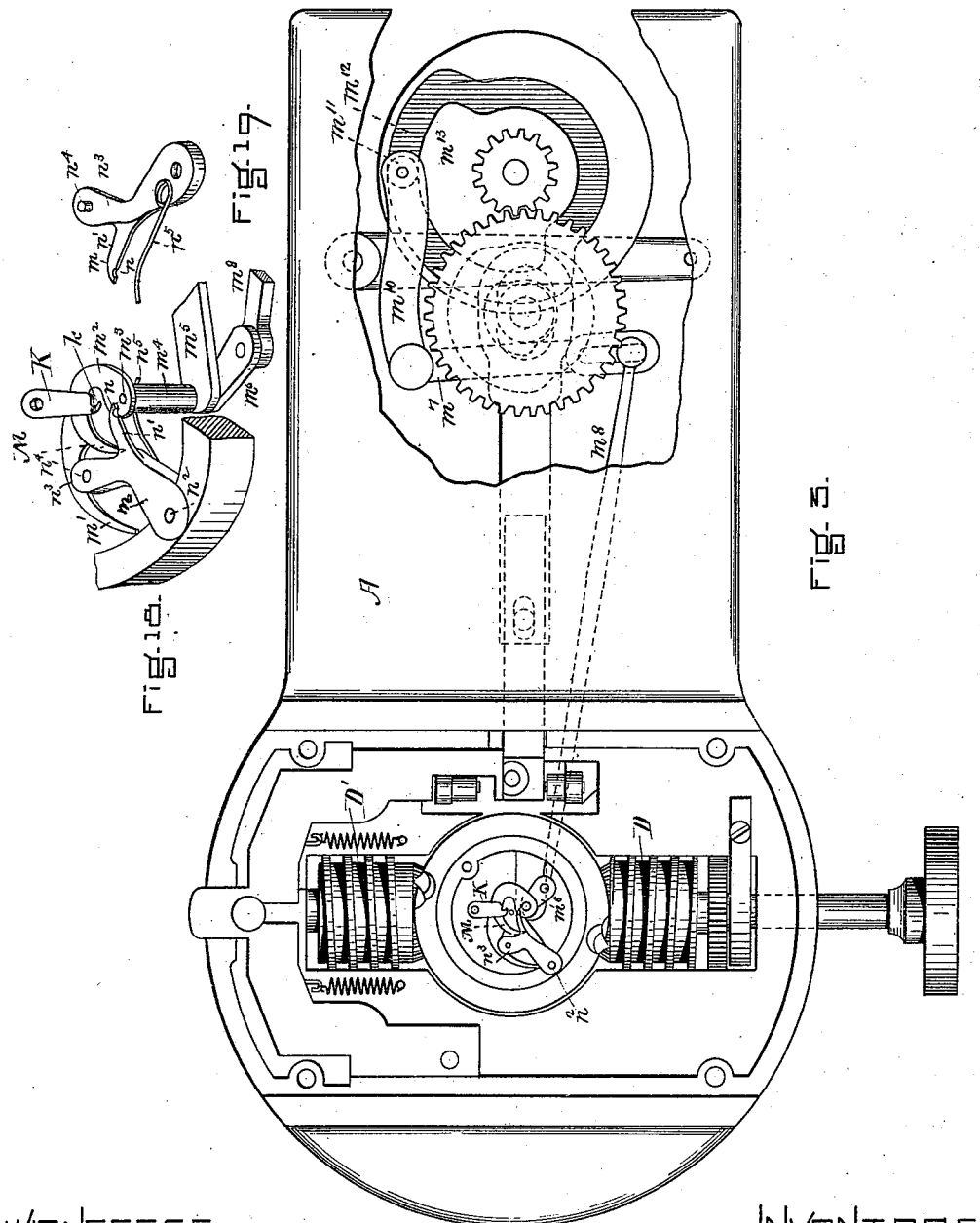
WITNESSES.
J. M. Dolan.
Fred. B. Dolan.
INVENTORS.
James H. Reed
Forrest W. Beale
by their attys
Clarke & Raymond.

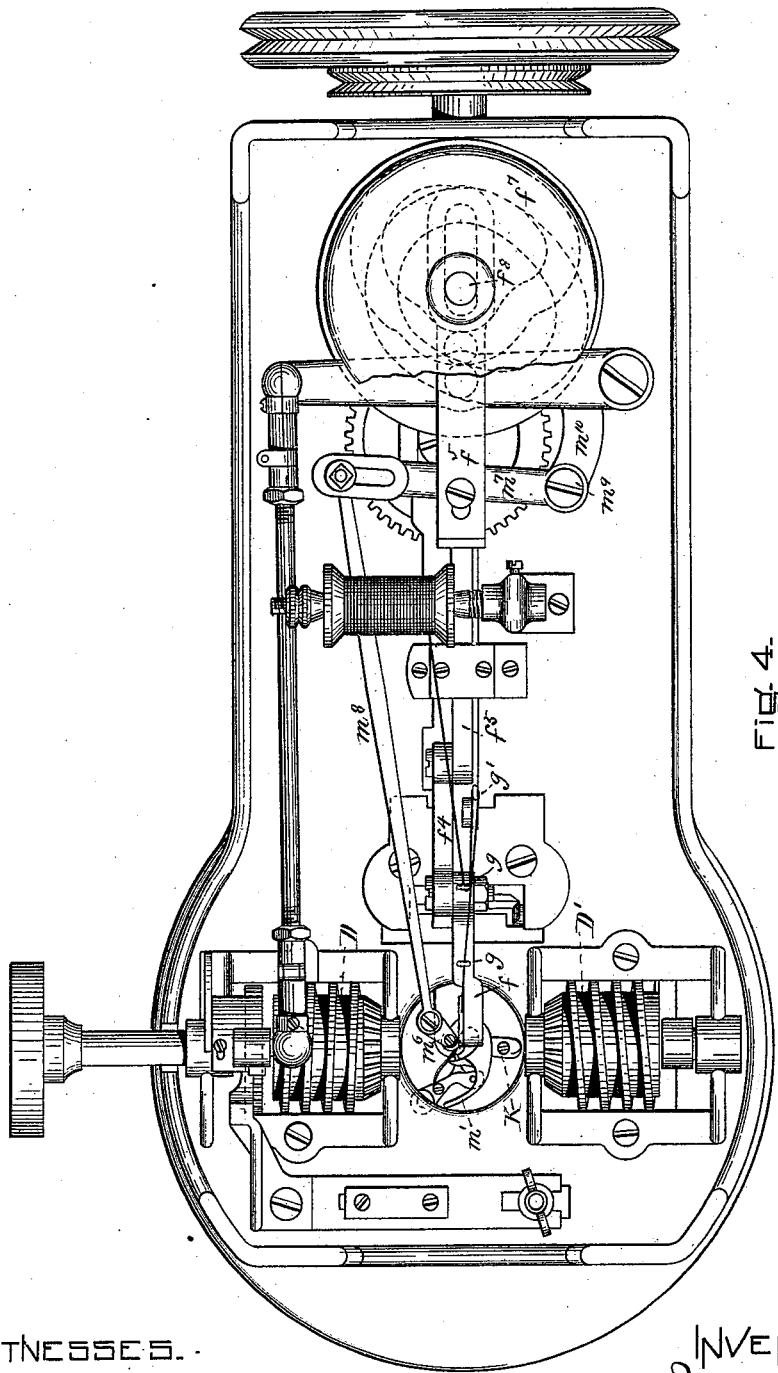

(No Model.) 7 Sheets—Sheet 5.
J. H. REED & F. W. BEALE.
BUTTON HOLE STITCHING AND BARRING MACHINE.
No. 355,028. Patented Dec. 28, 1886.
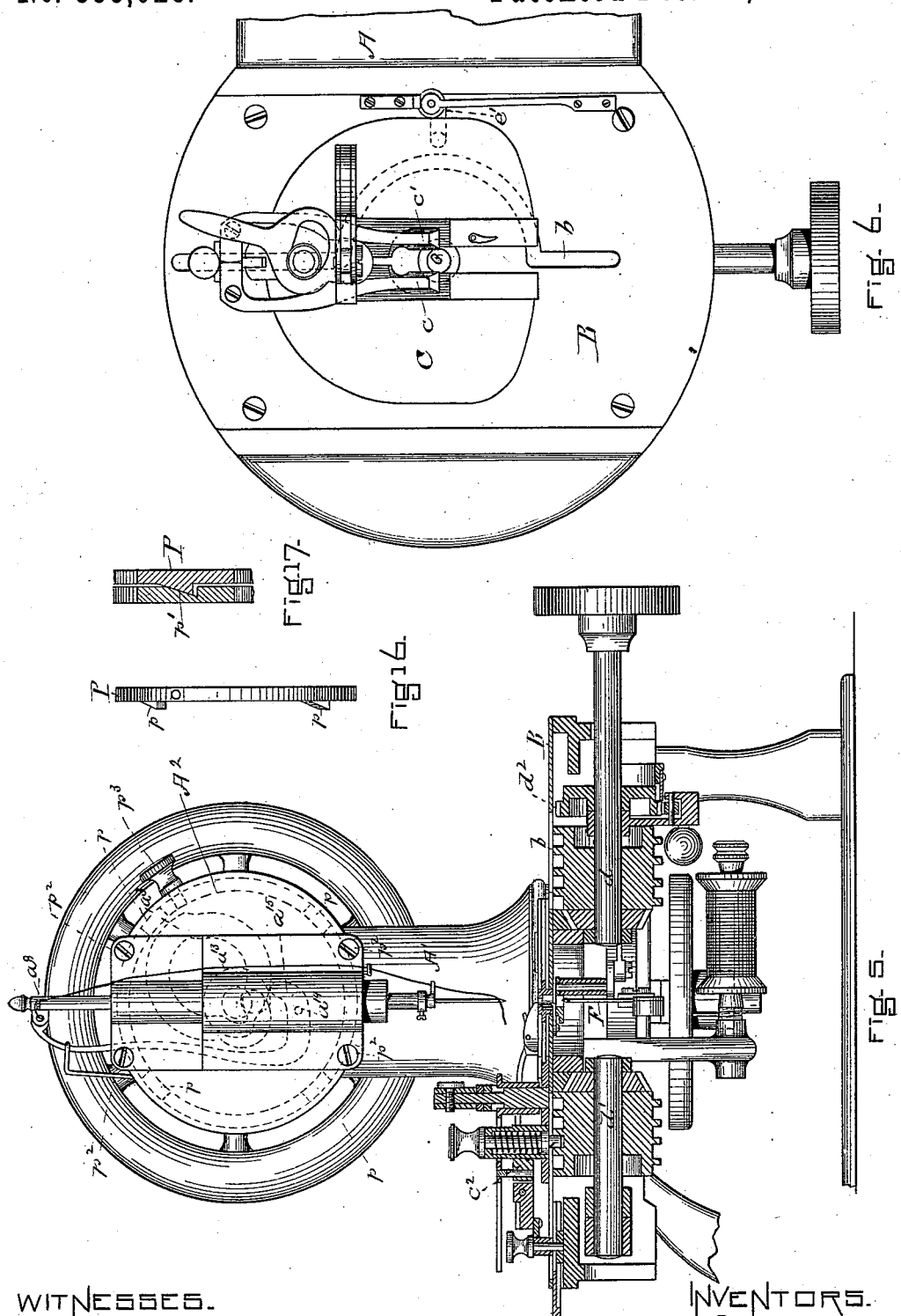
WITNESSES.
INVENTORS.

(No Model.) 7 Sheets—Sheet 6.
J. H. REED & F. W. BEALE.
BUTTON HOLE STITCHING AND BARRING MACHINE.
No. 355,028. Patented Dec. 28, 1886.
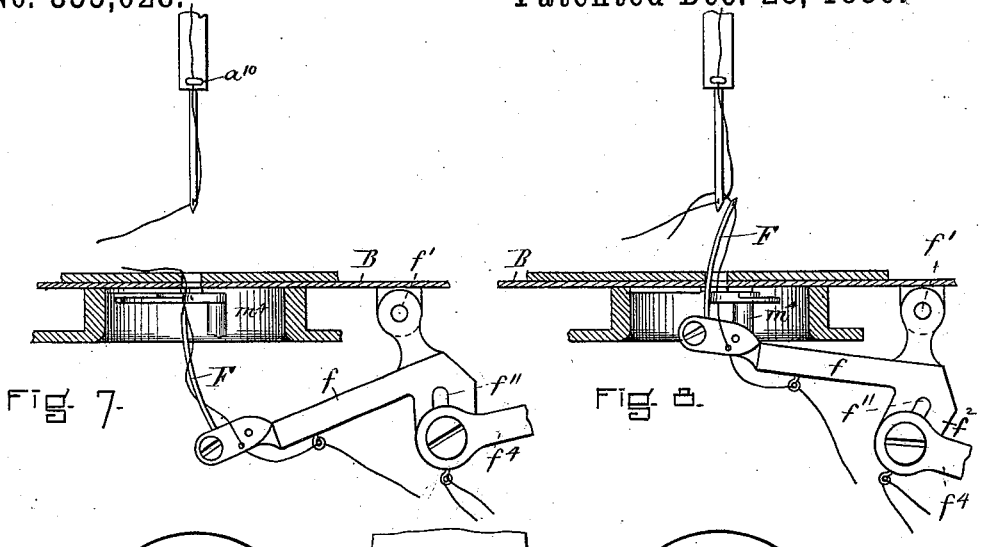
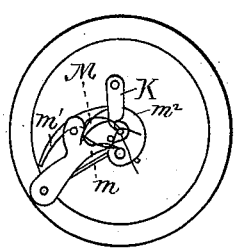
Fig. 11.
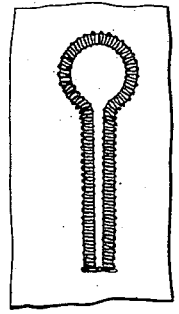
Fig. 13.
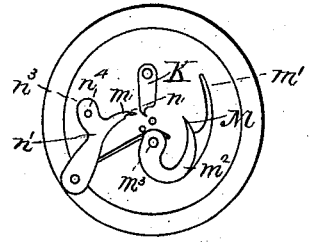
Fig. 12.
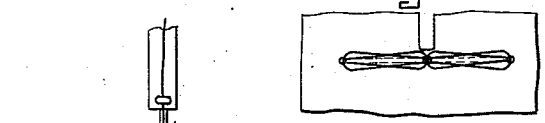
Fig. 15
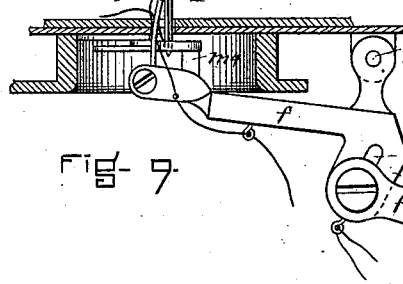
Fig. 7.
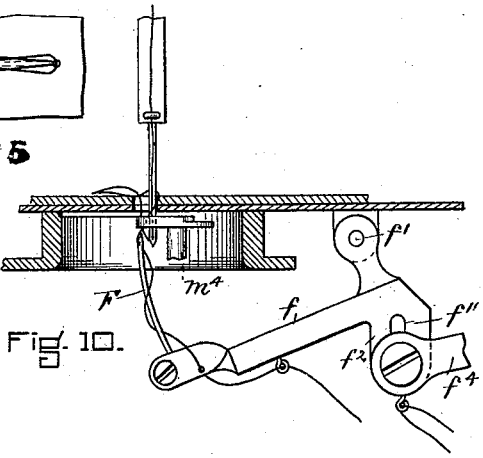
Fig. 10.
WITNESSES.
J. M. Dolan.
Fred. B. Dolan.
Fig. 14.
INVENTORS.
James H. Reed
Ernest W. Beale
by their attys
Clarke & Raymond (No Model.) 7 Sheets—Sheet 7.

J. H. REED & F. W. BEALE.
BUTTON HOLE STITCHING AND BARRING MACHINE.

No. 355,028. Patented Dec. 28, 1886.

WITNESSES.
J. N. Dolan
Fred. B. Dolan.

INVENTORS
James H. Reed
Frost W. Beale
by their attys
Clarke & Raymond.

UNITED STATES PATENT OFFICE.

JAMES H. REED AND FORREST W. BEALE, OF LYNN, MASSACHUSETTS, ASSIGNORS, BY MESNE ASSIGNMENTS, TO THE GLOBE BUTTON HOLE MACHINE COMPANY, OF PORTLAND, MAINE.

BUTTON-HOLE STITCHING AND BARRING MACHINE.

SPECIFICATION forming part of Letters Patent No. 355,028, dated December 28, 1886.

Application filed May 28, 1886. Serial No. 203,506. (No model.)

*To all whom it may concern:*

Be it known that we, JAMES H. REED and FORREST W. BEALE, both of Lynn, in the county of Essex and State of Massachusetts, both citizens of the United States, have invented a new and useful Improvement in Button-Hole Stitching and Barring Machines, of which the following is a full, clear, and exact description, reference being had to the accompanying drawings, forming a part of this specification, in explaining its nature.

The object of the invention is to provide a simple and efficient means for quickly stitching the sides and eye of a button-hole, and for forming a bar across the end thereof without stopping the operation of the machine; and the invention relates to the employment of two reciprocating needles, the upper of which is straight and is non-vibrating and the lower of which is curved and non-vibrating; to suitable cams for operating them, as hereinafter specified; to the employment, in connection therewith, of suitable looping devices and take-ups, and to a clamp-plate adapted to be moved forward to present the work to the stitch-forming devices with an intermittent movement, and to be oscillated to present the work to the needles during the operation of barring, so that the stitching of the sides and eye and the barring form a continuous operation or movement.

The invention further relates to various details of construction and organization, all of which will hereinafter be described.

Figure 20:
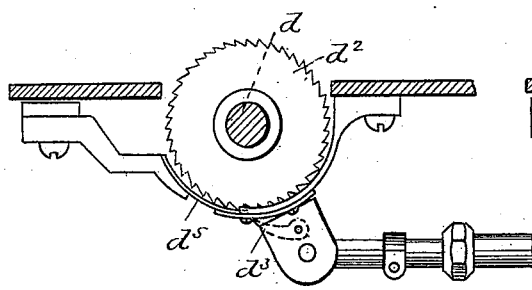
Figure 21:
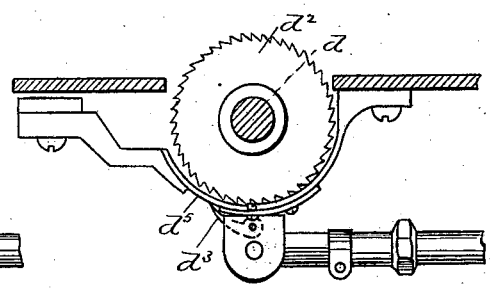
Figure 22:
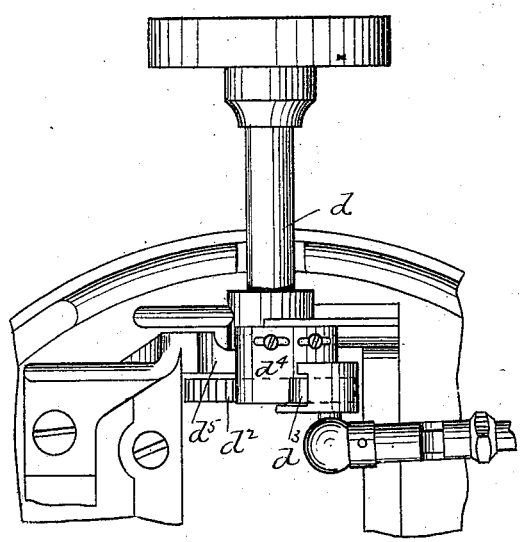
Figure 23:
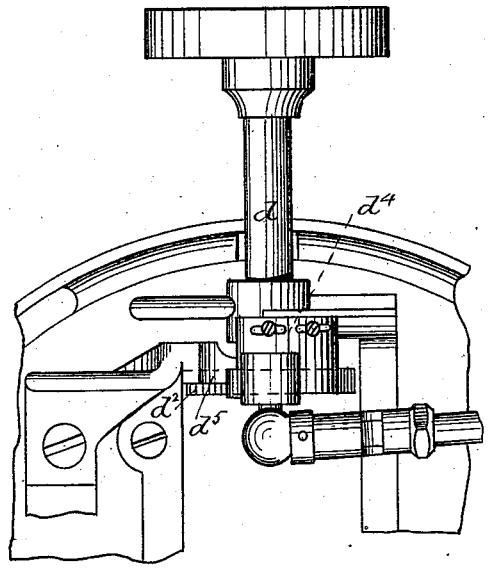

Figure 1 is a front elevation of the machine, a portion of the frame being removed to show the operative parts beyond. Fig. 2 is a vertical central section of the machine without a portion of the button-hole clamping mechanism. Fig. 3 is a plan view of the bed of the machine and parts below it. Fig. 4 is a plan view of the machine when in an inverted position. Fig. 5 is a vertical cross-section of the parts of the machine below the upper needle and a side elevation of the parts above it. Fig. 6 is a plan view of a portion of the bed, work-plate, clamping and feeding plate, and button-hole clamping and feeding devices, showing the position of the plate during the operation of barring. Figs. 7, 8, 9, and 10 show the different positions of the two needles in relation to each other during the process of forming the stitch, to which reference will be hereinafter made. Figs. 11 and 12 represent enlarged views of the lower looping devices. Fig. 13 is a view of a stitched button-hole. Fig. 14 is a view, enlarged, representing the relation which the threads bear to each other in forming or making the stitch. Fig. 15 is a view representing in plan, enlarged, the form of construction of the barring-stitch. Fig. 16 is a view in side elevation, and Fig. 17 in horizontal section, of a device for adjusting the position of the upper needle and needle-bar, to which reference will hereinafter be made. Fig. 18 is a view in perspective of the looping mechanism. Fig. 19 is a view in perspective of a part thereof. Fig. 20 is a detail view illustrating the manner of connecting and disconnecting the driving-pawl with the ratchet-wheel on the feed-wheel shaft. It shows the ratchet-pawl disengaged. Fig. 21 is a view of the same parts, showing the ratchet-wheel engaged. Figs. 22 and 23 are views of these parts inverted in plan to further illustrate their construction and operation.

A is the bed of the machine. A' is a curved arm or bracket, preferably cast integral with the remainder of the frame of the machine, having at its front end an enlarged circular shell, $A^2$, for holding the cam which operates the upper or straight reciprocating needle. The post A' supports the driving-shaft $a$, which is suitably mounted thereon, and which carries at its front end the cam-disk $A^3$, for reciprocating the needle-bar $A^4$. This needle-bar has suitable bearings in the block or cap $a'$, which is fastened to the end of the bracket or post A', and a cam-pin, $a^2$, which enters a cam-groove, $a^3$, in the cam-disk $A^3$. This cam-disk also has another cam for operating the upper take-up, to which reference will hereinafter be made. The needle-bar $A^4$ supports the needle $a^4$, having an eye in its point and taking thread from the spool $a^5$ through a suitable tension, $a^6$, and take-up $a^7$, guide $a^8$ on the upper part of the needle-bar, stationary guide $a^9$, and guide $a^{10}$ at the lower end of the needle-bar. The take-up is adapted to be thrown outward to produce a tension upon the thread by the spring $a^{11}$, and it is moved inward against the pressure of the spring and held until the time for the operation of the take-up by the edge cam, $a^{13}$. (Shown in dotted outline in Fig. 5.) The take-up arm is pivoted at $a^{14}$, and its lower end, $a^{15}$, is curved to rest against the cam $a^{13}$. It will be seen from this description that the upper needle has only a reciprocating movement controlled by the cam. The time of its movements will be hereinafter given in connection with those of the lower needle.

B is the work-plate of the machine, and it has the guiding-slot $b$ for controlling the movement of the button-hole clamping and feeding plate C. This plate C is similar to that described in the application of the applicant, James H. Reed, filed February 1, 1886, Serial No. 190,525, for an organized machine for stitching the sides and eye of a button-hole and for barring it, using a single thread and single reciprocating needle arranged above the work-plate, and a clamp-plate having an intermittent feeding movement, which is converted into an oscillating barring movement automatically, and which is like that herein described; and we would only say in relation to it that it is provided with jaws $c\ c'$, for spreading the button-hole and holding the material clamped while it is being fed to the stitch-forming devices. (See Fig. 6.) It also has a spring-held guiding and feeding pin, $c^2$, (see Fig. 5,) like that described in said application. It is oscillated also upon the pin $c^2$ during the operation of the barring, substantially as described in said application. The mechanism for feeding the clamp-plate C and for stopping the feeding movement thereof immediately before the mechanism for oscillating the plate is brought to operative position is the same as that described in the said application, and need be but briefly described here.

D D' are worm feeding-rolls, which engage the pin $c^2$. They are carried by the shafts $d$ $d'$, and are rotated by a ratchet-wheel, $d^2$, on the shaft $d$, and a reciprocating pawl, $d^3$, which engages the ratchet-wheel during the feeding movement of the plate, and is held therefrom during the operation of barring, as described in said application. The two shafts $d\ d'$ are connected by bevel-gear and a horizontally-moving plate carrying feed-fingers, which engage the pin $c^2$ at given intervals, as described in Patent No. 344,678, dated June 29, 1886, to E. M. Phelps. The reciprocating pawl rides from the ratchet-wheel upon a stationary covering-plate, $d^4$, at the end of each backward movement until the clamp-plate with a movable pin or block, which is connected with a sliding covering-plate, $d^5$, arranged to be moved over the ratchet-wheel, so that upon contact of the clamp-plate with said pin or block this sliding or movable covering-plate is moved over the ratchet-wheel, and the pawl upon its subsequent movement rides thereon and is held from the ratchet-wheel, so that the feed of the clamp-plate is stopped. Simultaneously with this movement of the covering-plate to disconnect the feed-pawl from the ratchet the barring-pin block, hereinafter referred to, is released and brought into operative position. This construction of parts is very well and fully explained in the application above referred to. We would say, however, that the clamp-plate is provided with a recess for receiving the reciprocating barring pin or block when it is released, as above indicated, in order that it may engage the plate and provide it with the oscillating movement upon its guide-pin, hereinafter indicated.

E is the throat-plate or button of the machine, and $e$ the throat. The throat-plate or button is recessed upon its under side to permit the reciprocating movement of the clamping-plate in barring, as described in said application, and the clamping-plate is held against the throat-plate as it is fed by the spring-held roll $e'$. (See Fig. 6.)

F is the lower or curved needle. It is supported by the arm $f$, which is pivoted at $f'$ to a support or bracket extending downward from the bed of the machine. (See Figs. 7, 8, 9, and 10.) This needle-carrying arm $f$ also has a downward-extending arm $f^2$, which is connected with the slide-bar $f^3$ by a link, $f^4$. The slide-bar is reciprocated at desired intervals by the link $f^5$ and cam-groove $f^6$ in the cam-disk $f^7$ at the lower end of the vertical shaft $f^8$. This vertical shaft is operated from the main shaft $a$ by means of the bevel-gear $f^9 f^{10}$.

The curved needle F is so located and moved that it is caused to pass through the throat $e$ and the eye or opening of the button-hole, and to pass the upper needle closely to it and above the material, as will hereinafter be described. To vary the extent of its movement, we have provided the arm $f$ with a slot, $f^{11}$, in which the end of the link $f^4$ is made adjustable. The curved needle F has an eye in its point, and thread is taken from the spool G through guides $g$, take-up $g'$, and guide $g^2$, carried by the arm $f$. The take-up $g'$ preferably is a spring arm or rod attached at $g^3$ to the bed of the machine and moved by a pin, $g^4$, attached to the link $f^4$ (see Fig. 2) in one direction and returned at the proper interval of time, or upon the backward movement of the link $f^4$.

The looping mechanism is arranged beneath the throat-plate, and comprises three elements: first, a loop-holding point, K, (see Figs. 11, 12, and 13,) which comprises a thin plate rigidly fastened in place and having a point, $k$, arranged to project into the throat of the machine and turn upward, and adapted to engage or catch the loop or thread formed and carried by the upper needle and at the end of its downward movement; second, a movable point or loop-engaging device, M, which is oscillated or reciprocated close to the line of reciprocation of the upper needle, and is adapted to engage or catch the loop or thread carried thereby, and after it has been engaged or caught by the point $k$, and move the loop in a horizontal or lateral direction; third, a loop-spreader, $m$, which is operated or moved by a curved arm, $m'$, projecting from the arm $m^2$, carrying the loop-engaging point M, and which is adapted to engage the thread or loop after it has been seized or taken by the point M and carried laterally, and operates to spread or open it in a direction substantially at right angles to the line of movement of the point M, and so as to open the loop and provide a passage or space through which the lower curved needle may pass, the loop at that time being held at three places—namely, by the stationary point $k$, by the laterally-movable point M, and by the spreading-point $m$. The operation and construction of these devices are well shown in Figs. 11 and 12.

The piece $m^2$, which carries the point M, and the spreader-operating arm $m'$ are attached at $m^3$ to a post or shaft, $m^4$, supported by the arm or bracket $m^5$, and this shaft carries at its lower end a lever or arm, $m^6$, which is connected with the lever $m^7$ by means of the long link $m^8$, (see Fig. 4,) and this lever $m^7$ is a bent lever pivoted at $m^9$ to the bed of the machine, and has an arm, $m^{10}$, carrying at its end a cam-pin, $m^{11}$, which is operated by the cam-groove $m^{12}$ in the cam-disk $m^{13}$ on the vertical shaft $f^8$. The piece or part $m^2$ is so pivoted that the loop-engaging point $m$ upon the swinging movement of the part is caused to engage the loop or thread.

The loop-spreader $m$ is a point having a notch or recess, $n$, (see Figs. 11 and 12,) at the end of an arm, $n'$, which is pivoted at $n^2$. This arm $n'$ also has a short projection or arm, $n^3$, carrying a pin, $n^4$, which is so placed that the curved arm $m'$, upon the movement of the piece or part $m^2$, comes in contact with the pin, and by its continued movement moves the spreader $m$ inward or toward the throat, so that it engages the loop which has been picked up by the point M and moves it from the point, drawing the thread as it moves and enlarging the loop until the parts take the position represented in Fig. 11, and after the passage of the lower curved needle through the loop that is formed the part $m^2$ returns to its original position, releasing the spreader $m$, which is then returned to its original position by means of the spring $n^5$.

The reciprocating pin or block O, for oscillating the clamping-plate, is like that described in the said application, and is brought into operative position in a similar manner. It is caused to make a full reciprocation or motion, however, once in every two reciprocations of the needles, instead of a full reciprocation for every reciprocation of the needle, as described in said application. It is operated by a cam, $o$, substantially as described in said application; but the cam is arranged to make one revolution to every two revolutions of the cams operating the needles. This is accomplished by mounting the cam $o$ upon the stud $o'$, and providing it with a gear, $o^2$, which meshes with the gear $o^3$ upon the shaft $f^8$.

In operation the work is placed upon the clamp-plate, the button-hole spread by the clamping and holding jaws, and the machine started. The lower curved needle is first moved up through the throat and the hole or slit of the button-hole, carrying with it the thread from the lower spool, which is carried past or by the line of reciprocation of the upper needle, which at that time is in its highest position, and when the curved needle has reached its highest position the two needles bear the relation to each other shown in Fig. 8. The lower curved needle is then moved downward very slightly, sufficiently, however, to cause the thread to bulge or extend away from the needle, and simultaneously with this movement the upper needle begins to move downward, and its point passes through the loop of the lower thread, carrying with it the upper thread. The upper needle is moved downward, carrying with it the upper thread, and immediately starts back or moves upward, and the loop is caught by the stationary loop holder or point $k$. The movable point M of the looping device immediately engages the loop of the upper thread thus caught and moves it laterally while the upper needle is moving upwardly, and the spreader $m$ operates to engage the thread carried by the point M and to open or spread the loop, in order that the curved needle may enter it on its upward movement. Meanwhile the lower curved needle has been moved downward to its lowest position, and after the upper needle has reached its highest position, and while the loop of the upper thread is held open by the loop holder and spreader, it is moved upward, passing through the loop of the upper thread and carrying with it the lower thread, when the looper and spreader are returned to their original position, releasing the loop of the upper thread. This alternating action of the needles and looper is still further illustrated in Figs. 9 and 10, and produces a stitch upon the edge of the button-hole, which is represented in Figs. 13 and 14.

Of course it will be understood that the straight needle passes through the material parallel with the edge of the button-hole.

It will be understood that the clamping-plate has an intermittent forward movement between each reciprocation of the needles, there being an interval of time immediately after the completion of the upward movement of the upper needle, in which this movement takes place. It will be understood, also, that the barring mechanism or devices for stopping the intermittent forward movement of the clamp-plate, and for then immediately oscillating it upon its guide-pin, are brought into operation upon the completion of the stitching of the sides of the button-hole, when the movement of the clamp-plate, instead of being an intermittent forward one, becomes an oscillating one. It will also be seen that neither needle is vibrated—that is, it is reciprocated in one path or upon one curve—and that there is no necessity for vibrating either needle, as two threads are used, and the needles are so disposed in relation to each other as to render their vibratory movement or a vibratory movement of the clamping-plate during the stitching of the sides of the button-hole unnecessary. It will also be understood, of course, that the *** cord used in binding button-holes is employed, and it is fed as in other machines. It will also be understood that the stitching of the button-hole begins at the inner end thereof and continues around from that end along one side, about the eye, and down the other side to the end of the hole, and that the barring-stitch is then made by the oscillation of the clamping-plate moving the material backward and forward between the two needles, and that this continues as an automatic movement without stopping the machine.

We have provided the clamping-plate with one complete oscillation for every two reciprocations of the needles, in order that there may be formed a barring-stitch across the end of the binding-cord to stay the button-hole, which somewhat resembles a figure 8 turned upon its edge—that is, the first stitch extends from the line in continuation of the center of the button-hole to the outer edge of the line of stitches upon one side, and the next stitch upon the movement of the plate extends from the point in continuation of the line of stitching upon the other side of the button-hole to a line in continuation of the central line of the button-hole, as represented in Fig. 20. This stitch provides a very efficient, strong, and durable way of securing the ends of the cord together, and barring, staying, and finishing the end of the button-hole.

Both the upper and lower take-ups are so operated or timed as to slacken the tension upon the threads and cause the formation of loops at the ends of the respective movements of the needles. For instance, immediately upon the end of the upward movement of the curved needle F the tension upon the thread is loosened by the movement of the lower take-up, and upon a slight downward movement of the needle a loop is partly formed at the end of the needle, through which the upper needle immediately moves, drawing with it the upper thread. Likewise, at the end of the downward movement of the upper needle, the tension is slackened by the upper take-up, so that a loop is formed at the end of the needle in a like manner.

It is desirable to adjust the upper needle, $a^4$, in relation to the center of the throat or line of reciprocation of the curved needle, in order that the length of the stitch may be varied. This is accomplished by moving the cap or block carrying the needle-bar outwardly in relation to the cam $A^3$ and the end of the bracket or arm $A'$. This is accomplished by means of a movable ring, P, (represented in Figs. 5, 16, and 17,) which has a number of inclined surfaces, $p$, on its outer surface, arranged to bear against a similar number of inclined surfaces, $p'$, arranged in the inner surface of the block or cap carrying the needle-bar. It is obvious that upon the release of the screws $p^2$, which fasten the cap to the bracket sufficiently, and the turning of the ring P, that the position of the cap in relation to the end of the arm or bracket and to the cam may be varied, being moved inwardly or outwardly, and after each adjustment is made the screws $p^2$ are tightened. The ring P is moved by a knob, $p^3$, fastened to a pin extending through a slot or recess formed in the head of the bracket or arm, as represented in Fig. 1. Of course this movement of the part carrying the needle-bar causes the cam-pin attached thereto to be moved inward or outward in relation to the cam-groove $a^3$, and the cam-groove must of course be made deep enough to allow such movement to take place. This movement of the needle-bar varies the position of the upper needle laterally in relation to the throat, and of course affords means by which the length of the stitch may be changed or varied.

Having thus fully described our invention, we claim and desire to secure by Letters Patent of the United States—

1. The combination, in a button-hole-stitching machine, of a clamp-plate for holding and presenting the material to the stitch-forming devices, and feeding mechanism for moving it thereto with an intermittent motion with the throat of the machine, the reciprocating straight needle, the reciprocating curved needle, the take-ups and looping mechanism, and devices for automatically stopping the forward movement of the clamping-plate and at the same instant providing it with an oscillating movement in relation to the stitch-forming devices, all substantially as described.

2. The combination, in a button-hole stitching machine, of a straight reciprocating non-vibrating upper needle, its looping mechanism comprising the stationary loop-holder K, the loop-engaging point M, positively operated as described, the loop-spreader $m$, operated by contact of the looper or movable arm $m'$ therewith, and the reciprocating curved non-vibrating eye-pointed lower needle arranged to operate in relation to the upper needle as described, all substantially as set forth.

3. The combination, in a button-hole-stitching machine, with a reciprocating straight upper needle and a reciprocating curved lower needle arranged in relation to each other and operated substantially as specified, of the looper $M^2$, positively operated, as described, having the point $m$ and the arm $m'$, with the arm $n'$, having the notched spreading-point $n$, and the pin or projection $n^3$, adapted to be engaged by the arm $n'$ and the spring $n^5$, substantially as described.

4. In a sewing-machine having a reciprocating upper straight needle and a reciprocating lower curved needle, the loop-spreader $m$, adapted to be moved positively in one direction by a cam and suitable connecting devices, said cam and connecting devices, and a spring for moving the spreader in an opposite direction, substantially as described.

5. The combination, in a button-hole-stitching machine, of the reciprocating straight non-vibrating upper needle with the curved reciprocating non-vibrating lower needle, F, the lever $f$, link $f^4$, slide-bar $f^3$ $f^5$, the cam $f^6$, and suitable looping mechanism, substantially as described.

6. The combination, in a button-hole-stitching machine, of the clamp-plate, devices, substantially as specified, for providing it with an intermittent forward movement during the stitching of the sides and eye of the button-hole, the stitch-forming mechanism, comprising a reciprocating straight upper needle, a reciprocating curved non-vibrating eye-pointed lower needle, suitable looping mechanism, and devices for automatically stopping the forward feeding movement of the clamp-plate at the end of said feeding movement, and for moving it laterally in relation to the two needles, whereby a barring-stitch is formed, substantially as described.

7. The combination of the reciprocating straight upper needle, the reciprocating curved under needle, the clamp-plate, its guide-pin, the stud or block O, for engaging the clamp-plate and oscillating its operating-cam $o$, shaft $o'$, and reducing-gearing $o^2$ $o^3$, substantially as described.

8. The combination of the needle-bar, its holding-block, the support therefor, and an interposed ring having projections provided with inclined surfaces arranged to bear upon the inclined surfaces of said holding bar or support, substantially as described.

9. The combination of the needle-bar, its holding-block, the support therefor, and an interposed ring having projections provided with inclined surfaces arranged to bear upon the inclined surfaces of said block or support, and devices for rigidly locking the needle bar, block, or cap to its support or head, all substantially as described.

JAMES H. REED.
FORREST W. BEALE.

Witnesses:
F. F. RAYMOND, 2d,
J. M. DOLAN.